United States Patent
Lum et al.

(10) Patent No.: US 9,396,515 B2
(45) Date of Patent: Jul. 19, 2016

(54) RENDERING USING MULTIPLE RENDER TARGET SAMPLE MASKS

(71) Applicant: NVIDIA CORPORATION, Santa Clara, CA (US)

(72) Inventors: Eric B. Lum, San Jose, CA (US); Jerome F. Duluk, Jr., Palo Alto, CA (US); Yury Y. Uralsky, Santa Clara, CA (US); Rouslan Dimitrov, San Carlos, CA (US); Rui M. Bastos, Porto Alegre (BR)

(73) Assignee: NVIDIA CORPORATION, Santa Clara, CA (US)

( * ) Notice: Subject to any disclaimer, the term of this patent is extended or adjusted under 35 U.S.C. 154(b) by 206 days.

(21) Appl. No.: 13/969,408

(22) Filed: Aug. 16, 2013

(65) Prior Publication Data

US 2015/0049110 A1    Feb. 19, 2015

(51) Int. Cl.
*G06T 1/20* (2006.01)
*G06T 1/60* (2006.01)
*G06T 15/50* (2011.01)

(52) U.S. Cl.
CPC ... *G06T 1/60* (2013.01); *G06T 1/20* (2013.01); *G06T 15/503* (2013.01)

(58) Field of Classification Search
None
See application file for complete search history.

(56) References Cited

U.S. PATENT DOCUMENTS

| | | | |
|---|---|---|---|
| 6,115,049 A * | 9/2000 | Winner et al. | |
| 7,456,846 B1 * | 11/2008 | King et al. | 345/613 |
| 7,489,318 B1 * | 2/2009 | Wilt | G09G 3/363 345/506 |
| 2003/0128222 A1 * | 7/2003 | Kirkland et al. | 345/611 |
| 2007/0070082 A1 * | 3/2007 | Brennan | 345/592 |
| 2009/0091577 A1 * | 4/2009 | Brothers | 345/506 |
| 2010/0110102 A1 * | 5/2010 | Nystad et al. | 345/611 |
| 2011/0090251 A1 * | 4/2011 | Donovan et al. | 345/632 |
| 2013/0141445 A1 * | 6/2013 | Engh-Halstvedt et al. | 345/506 |
| 2014/0267377 A1 * | 9/2014 | Halstvedt | G06T 11/40 345/613 |

* cited by examiner

*Primary Examiner* — Kee M Tung
*Assistant Examiner* — Ryan M Gray
(74) *Attorney, Agent, or Firm* — Artegis Law Group, LLP

(57) ABSTRACT

One embodiment sets forth a method for transforming 3-D images into 2-D rendered images using render target sample masks. A software application creates multiple render targets associated with a surface. For each render target, the software application also creates an associated render target sample mask configured to select one or more samples included in each pixel. Within the graphics pipeline, a pixel shader processes each pixel individually and outputs multiple render target-specific color values. For each render target, a ROP unit uses the associated render target sample mask to select covered samples included in the pixel. Subsequently, the ROP unit uses the render target-specific color value to update the selected samples in the render target, thereby achieving sample-level color granularity. Advantageously, by increasing the effective resolution using render target sample masks, the quality of the rendered image is improved without incurring the performance degradation associated with processing each sample individually.

26 Claims, 5 Drawing Sheets

RENDERING USING MULTIPLE RENDER TARGET SAMPLE MASKS

BACKGROUND OF THE INVENTION

1. Field of the Invention

The present invention generally relates to graphics processing and, more specifically, to rendering using multiple render target sample masks.

2. Description of the Related Art

A graphics processing pipeline performs the collection of processing steps performed to transform 3-D images into rendered 2-D images. As part of transforming a 3-D image, the image is divided into a two dimensional array of pixels, each representing a different image location. The dimensions of this two dimensional array of pixels defines the resolution of the rendered 2-D image. Since the viewer's ability to resolve images may exceed the resolution of the rendered 2-D image, visual artifacts produced during the rendering may reduce the realism of the 2-D image. For example, if an edge of a triangle is not aligned with a vertical or horizontal line of pixel locations, the edge will exhibit a jagged, stair-step appearance in the rendered 2-D image. Various techniques may be used to reduce the appearance of such errors and visual artifacts (e.g., smooth the appearance of jagged edges), thereby improving the realism of the rendered images.

One approach to improving the realism of rendered images is through multisampling operations. In multisampling, each pixel is subdivided into samples, and a pixel shader (included in the graphics processing pipeline) processes each pixel individually. For each pixel, the pixel shader computes a sample color value at each the covered samples (i.e., the set of samples that are covered by a particular graphics primitive). Subsequently, the pixel shader resolves these sample colors into a single pixel color value. Finally, the single pixel color value is broadcast to each of the covered samples, which results in the same color value being assigned to each sample in the pixel that is covered by the graphics primitive. The raster operations units (also include in the graphics processing pipeline) then uses the single pixel color associated with this graphics primitive to update the overall pixel color. One limitation to this approach is that the quality of the image may still be unacceptably low.

For example, suppose that a pixel were to include four samples that were all covered by a first triangle (a graphics primitive). Further, suppose that two left-most samples were covered by blue portions of the first triangle and the two right-most samples were covered by yellow portions of the first triangle. As part of rendering the first triangle, the pixel shader would assign a green color (a mixture of blue and yellow) to each of the four samples. By resolving the sample colors in this fashion, per-sample information would be lost. For instance, information that the two left-most samples were covered by blue portions of the first triangle would longer be available. Suppose further that a second triangle were to be subsequently rendered on top (i.e., at a depth closer to the viewer) of the first triangle. And suppose that the two right-most samples were covered by blue portions of the second triangle, but the two left-most samples were not covered by the second triangle. As part of rendering the second triangle, the pixel shader would assign a blue color to the two right-most samples, but would not assign a color to the two left-most samples. The ROP unit would then update the overall pixel color to consider both the contributions of the first triangle and the second triangle. Consequently, the final processed color of the pixel would be a mixture of the green color and the blue color. However, after the addition of the second triangle, the color values at each of the sample locations included in the pixel would be blue in the 3-D image. Thus, using multisampling to create the rendered 2-D image would distort the true color of the 3-D image.

Another approach to improving the realism of rendered images is supersampling. In supersampling, the pixel shader computes an individual color value for each sample and does not resolve the sample color values into a single pixel color value. One drawback to supersampling is that the pixel shader processes each sample individually, thus the entire pixel shading calculation is performed per sample. In particular, time consuming operations performed by the pixel shader, such as texture fetches, are performed per sample. Typically, the majority of the execution time required during rendering is spent performing pixel shading operations. Consequently, supersampling can lead to inefficiencies in the graphics processing pipeline and reduce the rendering frame rate. The reduced rendering frame rate may be unacceptable for many graphics-based software applications such as video games.

As the foregoing illustrates, what is needed in the art is a more effective technique to improve the realism of rendered images.

SUMMARY OF THE INVENTION

One embodiment of the present invention sets forth a method for updating samples included in render targets. The method includes receiving a first render target related to a first surface; receiving first pixel data related to a first pixel included in the first surface; computing a first color value based on the first pixel data; creating a first composite mask based on a first coverage mask and a first render target sample mask, where the first coverage mask is associated with the first surface, and the first render target sample mask is associated with the first render target; and updating a first sample included in the first render target and associated with the first pixel based on the first color value and the first composite mask.

Other embodiments of the present invention include, without limitation, a computer-readable storage medium including instructions that, when executed by a processing unit, cause the processing unit to implement aspects of the techniques described herein as well as a system that includes different elements configured to implement aspects of the techniques described herein.

One advantage of implementing the disclosed techniques is that the realism of rendered 2-D images may be improved without incurring the dramatic efficiency reduction associated with processing each sample individually. Consequently, software applications that exceed acceptable execution times or produce unacceptable results using prior-art techniques may produce acceptable results without exceeding acceptable execution times using the disclosed techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
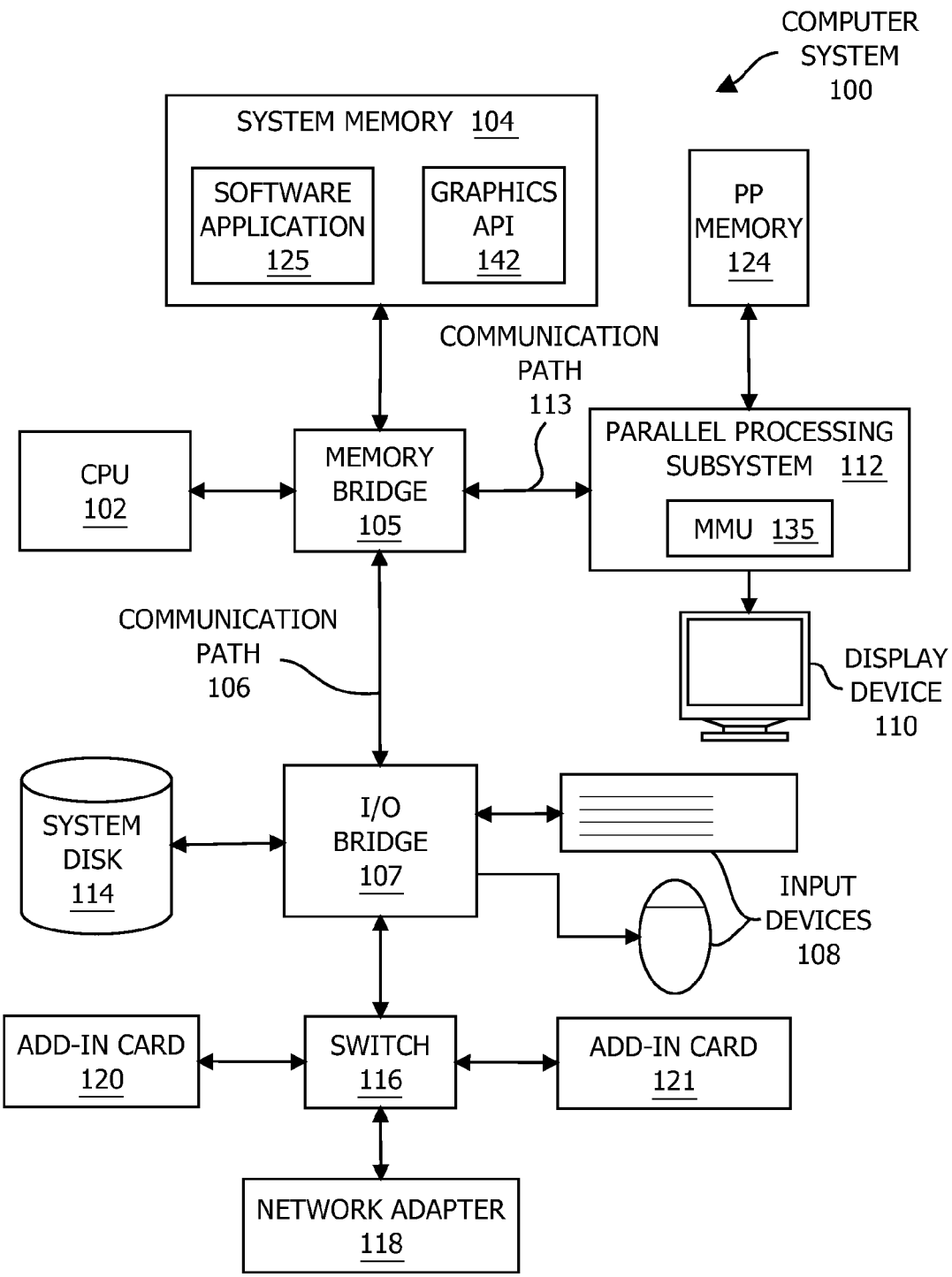
FIG. 1 is a block diagram illustrating a computer system configured to implement one or more aspects of the present invention.

FIG. 1 is a block diagram illustrating a computer system 100 configured to implement one or more aspects of the present invention. As shown, the computer system 100 includes, without limitation, a central processing unit (CPU) 102 and a system memory 104 communicating via an interconnection path that may include a memory bridge 105. The memory bridge 105, which may be, e.g., a Northbridge chip, is connected via a bus or other communication path 106 (e.g., a HyperTransport link) to an I/O (input/output) bridge 107. The I/O bridge 107, which may be, e.g., a Southbridge chip, receives user input from one or more user input devices 108 (e.g., keyboard, mouse) and forwards the input to the CPU 102 via the communication path 106 and the memory bridge 105. A parallel processing subsystem 112 is coupled to the memory bridge 105 via a bus or second communication path 113 (e.g., a Peripheral Component Interconnect (PCI) Express, Accelerated Graphics Port, or HyperTransport link); in one embodiment the parallel processing subsystem 112 is a graphics subsystem that delivers pixels to a display device 110 (e.g., a conventional cathode ray tube or liquid crystal display based monitor). A system disk 114 is also connected to the I/O bridge 107. A switch 116 provides connections between the I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to the I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

As shown, the parallel processing subsystem 112 is coupled to a local parallel processing (PP) memory 124. The parallel processing subsystem 112 and the parallel processing memory 124 may be implemented using one or more integrated circuit devices, such as programmable processors, application specific integrated circuits (ASICs), or memory devices, or in any other technically feasible fashion. As shown, the parallel processing subsystem 112 communicates with the rest of computer system 100 via the communication path 113, which connects to the memory bridge 105 (or, in one alternative embodiment, directly to the CPU 102). The connection of the parallel processing subsystem 112 to the rest of the computer system 100 may also be varied. In some embodiments, the parallel processing subsystem 112 is implemented as an add-in card that can be inserted into an expansion slot of the computer system 100. In other embodiments, the parallel processing subsystem 112 can be integrated on a single chip with a bus bridge, such as the memory bridge 105 or the I/O bridge 107. In still other embodiments, some or all elements of the parallel processing subsystem 112 may be integrated on a single chip with the CPU 102. In one embodiment, the communication path 113 is a PCI Express link. Other communication paths may also be used.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, the CPU 102, and the I/O bridge 107 to form a system on chip (SoC).

In operation, the CPU 102 is the master processor of the computer system 100, controlling and coordinating operations of other system components. In particular, the CPU 102 issues commands that control the operation of the parallel processing subsystem 112. Those commands may originate within a software application 125 resident in the system memory 104 and executing on the CPU 102. Advantageously, the parallel processing subsystem 112 may execute commands asynchronously relative to the operation of the CPU 102. A graphics application programming interface (API) 142 is also resident in the system memory 104. The graphics API 142 includes calls and libraries that expose parallel processing subsystem 112 functionality to application developers. Among other things, the graphics API 142 enables application developers to tailor the software application 125 to optimize the way the parallel processing subsystem 112 functions. In general, the software application 125 issues calls to the graphics API 142 to produce a desired set of results using components include in the parallel processing subsystem 112. In alternate embodiments, the graphics API may be replaced with any software program that exposes parallel processing subsystem functionality. For example, the graphics API may be replaced with a different general-purpose API. Further, the graphics API may be configured to inter-operate with one or more additional software stacks.

The parallel processing subsystem 112 may be provided with any amount of parallel processing memory 124 and may use the parallel processing memory 124 and the system memory 104 in any combination. The parallel processing subsystem 112 may transfer data from system memory 104 and/or the local parallel processing memory 124 into internal (on-chip) memory, process the data, and write result data back to system memory 104 and/or the local parallel processing memory 204, where such data can be accessed by other system components, including CPU 102 or another parallel processing subsystem 112. As shown, the parallel processing subsystem 112 includes a memory management unit (MMU)

135. The MMU 135, among other things, translates pages in one or more virtual address spaces to pages in a physical address space. To ensure optimal memory efficiency, the software application 125 may issue calls to control and coordinate some of the memory-related operations of the MMU 135.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, the system memory 104 is connected to the CPU 102 directly rather than through a bridge, and other devices communicate with the system memory 104 via the memory bridge 105 and the CPU 102. In other alternative topologies, the parallel processing subsystem 112 is connected to the I/O bridge 107 or directly to the CPU 102, rather than to the memory bridge 105. In still other embodiments, the I/O bridge 107 and the memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, the switch 116 is eliminated, and the network adapter 118 and the add-in cards 120, 121 connect directly to the I/O bridge 107.

Figure 2:
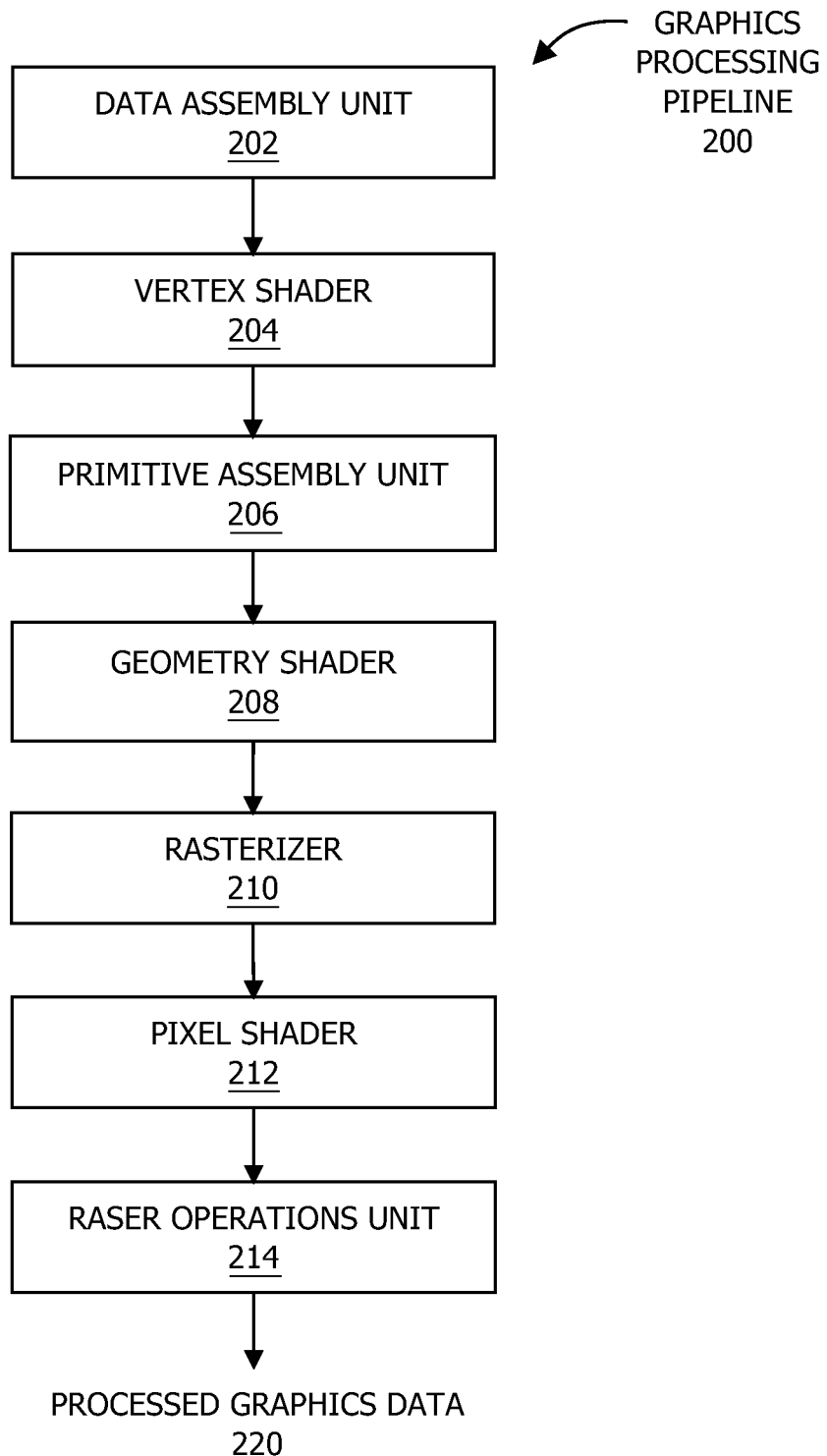
FIG. 2 is a conceptual diagram illustrating a programmable graphics processing pipeline residing within the parallel processing subsystem of FIG. 1, according to one embodiment of the present invention.

FIG. 2 is a conceptual diagram illustrating a programmable graphics processing pipeline 200 residing within the parallel processing subsystem 112 of FIG. 1, according to one embodiment of the present invention. The graphics processing pipeline 200 is configured to transform 3-D images into rendered 2-D images. As shown, the graphics pipeline 200 includes, without limitation, a data assembly unit 202, a vertex shader 204, a primitive assembly unit 206, a geometry shader 208, a rasterizer 210, a pixel shader 212, and a raster operations unit (ROP unit) 214.

One or more streaming multiprocessors (not shown) included in the parallel processing subsystem 112 may be configured to perform the functions of one or more of the vertex shader 204, the geometry shader 208, and the pixel shader 212. The functions of the data assembly unit 202, the primitive assembly unit 206, the rasterizer 210, and the ROP unit 214 may be performed by other processing engines within the parallel processing subsystem 112. Alternatively, the graphics processing pipeline 200 may be implemented using dedicated processing units for one or more functions. In alternate embodiments, the graphics processing pipeline may be configured with an expanded or reduced set of functionality. Further, the functionality of the graphics processing pipeline may be implemented in any technically feasible manner by any combination of general or specialized processing units included in the parallel processing subsystem.

The components included in the parallel processing pipeline (e.g., the data assembly unit 202, etc.) may access data that is stored in any accessible memory (e.g., the parallel processing memory 124, the system memory 104, etc.) in any combination. Typically, a component included in the graphics processing pipeline 112 reads input data from one or more memory buffers stored in accessible memory, processes the input data to produce output data, and stores the resulting output data in one or more memory buffers. A subsequent component included in the parallel processing pipeline 112 may read this resulting output data as input data for the subsequent component. The subsequent component processes the data and stores output data in one or more memory buffers, and so on.

The data assembly unit 202 is a processing unit that collects vertex data for high-order surfaces, primitives, and the like, and outputs the vertex data, including vertex attributes, to the vertex shader 204. The vertex shader 204 is a programmable execution unit that is configured to execute vertex shading programs, lighting and transforming vertex data as specified by the vertex shading programs. For example, the vertex shader 204 may be programmed to transform the vertex data from an object-based coordinate representation (object space) to an alternatively based coordinate system such as world space or normalized device coordinates (NDC) space.

The primitive assembly unit 206 is a processing unit that receives processed vertex data from the vertex shader 204 and constructs graphics primitives, e.g., points, lines, triangles, or the like, for processing by the geometry shader 208. The geometry shader 208 is a programmable execution unit that is configured to execute geometry shading programs, processing graphics primitives received from the primitive assembly unit 206 as specified by the geometry shading programs. The geometry shader 208 may be programmed to perform well-known per-primitive operations such as clipping. In addition, the geometry shader 208 may be programmed to subdivide the graphics primitives into one or more new graphics primitives and calculate parameters, such as vertex attribute or plane equation coefficients, that are used to rasterize the new graphics primitives. In some embodiments, the geometry shader 208 may also add or delete elements in the geometry stream. The geometry shader 208 outputs the parameters and new graphics primitives to the rasterizer 210.

The rasterizer 210 is a processing unit that scans the new graphics primitives and outputs fragments and coverage data to the pixel shader 212. Each of the fragments contain pixel data, which may include raster pixel coverage, raster position, depth complexity or interpolated vertex attributes, such as texture coordinates and opacity. Additionally, the rasterizer 455 may be configured to perform z culling and other z-based optimizations. The pixel shader 212 is a programmable execution unit that is configured to execute pixel shading programs, processing fragment data received from the rasterizer 210 as specified by pixel shading programs. For example, the pixel shader 212 may be programmed to perform operations such as perspective correction, shading, blending, and the like, to produce color data that is output to the raster operations unit 214. Fragments may be shaded at pixel, sample, or other granularity, depending on the programmed sampling rate.

The raster operations unit 214 is a processing unit that can perform near and far plane clipping, and generally performs raster operations, such as stencil, z test, blending and the like, and outputs pixel data as processed graphics data 220. In some embodiments, the raster operations unit 214 is configured to compress z or color data that is written to memory and decompress z or color data that is read from memory. Together, the rasterizer 210, the pixel shader 212 and the raster operations unit 214 represent the fragment processing domain of the parallel processing subsystem 112. The raster operations unit 214 may be used to operate on individual pixels or small squares of pixels, and the pixel shader 212 may be programmed to iterate across groups of pixels. Further, the pixel shader 212 and the raster operations unit 214 may be configured to treat samples as pixels.

The software application 125 of FIG. 1 issues calls to the graphics API 142 also of FIG. 1 to convey data to various components included in the graphics processing pipeline 200.

For instance, the software application 125 may issue calls to the graphics API 142 to convey vertex primitive attributes to the data assembly unit 202. In addition, the software application 125 uses the graphics API 142 to configure various components in the parallel processing pipeline 200, such as the pixel shader 212. In particular, the software application 125 may configure the graphics processing pipeline 200 to process multiple render targets. Typically, each pixel shader is configured to output a single color value. In contrast, as part of processing multiple render targets, one or more pixel shaders 212 are configured to output a separate color value to each render target. The pixel shaders 212 may be configured to process fragments at pixel, sample, or other granularity, depending on the programmed sampling rate. As outlined previously herein, performing pixel shading for each sample individually instead of performing pixel shading for each pixel individually improves the quality of rendered 2-D images. However, performing pixel shading for each sample individually noticeably reduces the efficiency of the graphics processing pipeline 200 compared to performing pixel shading for each pixel individually.

Advantageously, the graphics API 142, the pixel shader 212, and the ROP unit 214 are configured to extend the concept of multiple render target rendering to emulate pixel shading for each sample individually while performing pixel shading for each pixel individually. More specifically, the graphics API 142 includes calls or libraries that enable the software application 125 to specify a different render target sample mask for each render target. Each render target sample mask is configured to allow coverage to proceed to the associated render target for one or more samples included in the pixel. In addition, the pixel shader 212 is configured to output a different per-pixel color value to each of the render targets. The ROP unit 214 is configured to use the render target sample masks as part of determining which samples included in the render targets to update and which samples to leave unchanged.

The software application 125 may also configure the MMU 135 of FIG. 1 to map the addresses in the range of virtual address space corresponding to each of the multiple render targets to the same addresses in a physical address space. In other words, the software application 125 may configure the multiple render targets to write to the same addresses in physical memory. Advantageously, mapping the multiple render targets to the same physical memory enables the pixel shader 212 to process pixels individually, but output a separate color for each sample included in the pixel to a single surface in physical memory. For example, suppose that each pixel were to include four samples and the software application 125 were to specify four different render targets. In addition, suppose that the software application 125 were to direct the MMU 135 to map each of the four render targets to the same location in physical memory. Further, suppose that the software application were to specify four different render target sample masks, each associated with a different render target. Finally, suppose that each render target sample mask were configured to allow coverage to proceed to the associated render target for one sample. In such a scenario, if the pixel is fully covered, then the ROP unit 214 would update the color values of every sample included in the pixel using a different color value to update each sample. In alternate embodiments, the software application may alias each render target to the same range of addresses in a virtual space. Again, the render targets would map to the same location in physical memory, and the software application 125 would be able to perform per-sample color shading of a pixel without configuring the pixel shader 212 to process each sample individually.

In some alternate embodiments, the pixel shader 212, not the ROP unit 214, may be configured to use the render target sample masks 335 to determine which samples included in the render targets to update and which samples to leave unchanged. In other alternate embodiments, the pixel shader 212 may generate the render target sample masks 335 as outputs sent to the ROP unit, thereby allowing the pixel shader to independently vary the samples covered in each render target. In yet other alternate embodiments, the pixel shader 212 may receive the render target sample masks as inputs and may use the render target sample masks to filter samples, thereby reducing the time required for shading computations. Further, the pixel shader 212 may iterate upon pixels and filter samples during any iteration.

In other alternate embodiments, the render target sample masks may be generated in any technically feasible fashion. For example, the render target sample masks may be automatically generated by the parallel processing subsystem based on the render target index of the currently drained shaded quad. In particular, a programmable fixed-function block included in the graphics processing pipeline could be configured to reconcile shaded quads and assign proper coverage before the samples are written to memory. For example, the block could perform a bit-wise (i.e., on a bit-by-bit basis) logical AND operation of the raster coverage for quads or pixels corresponding to render target "1" with 0b0001, a logical AND operation of the raster the coverage for quads or pixels corresponding to render target "2" with 0b0010, and so on using subsequent powers of 2.

Figure 3:
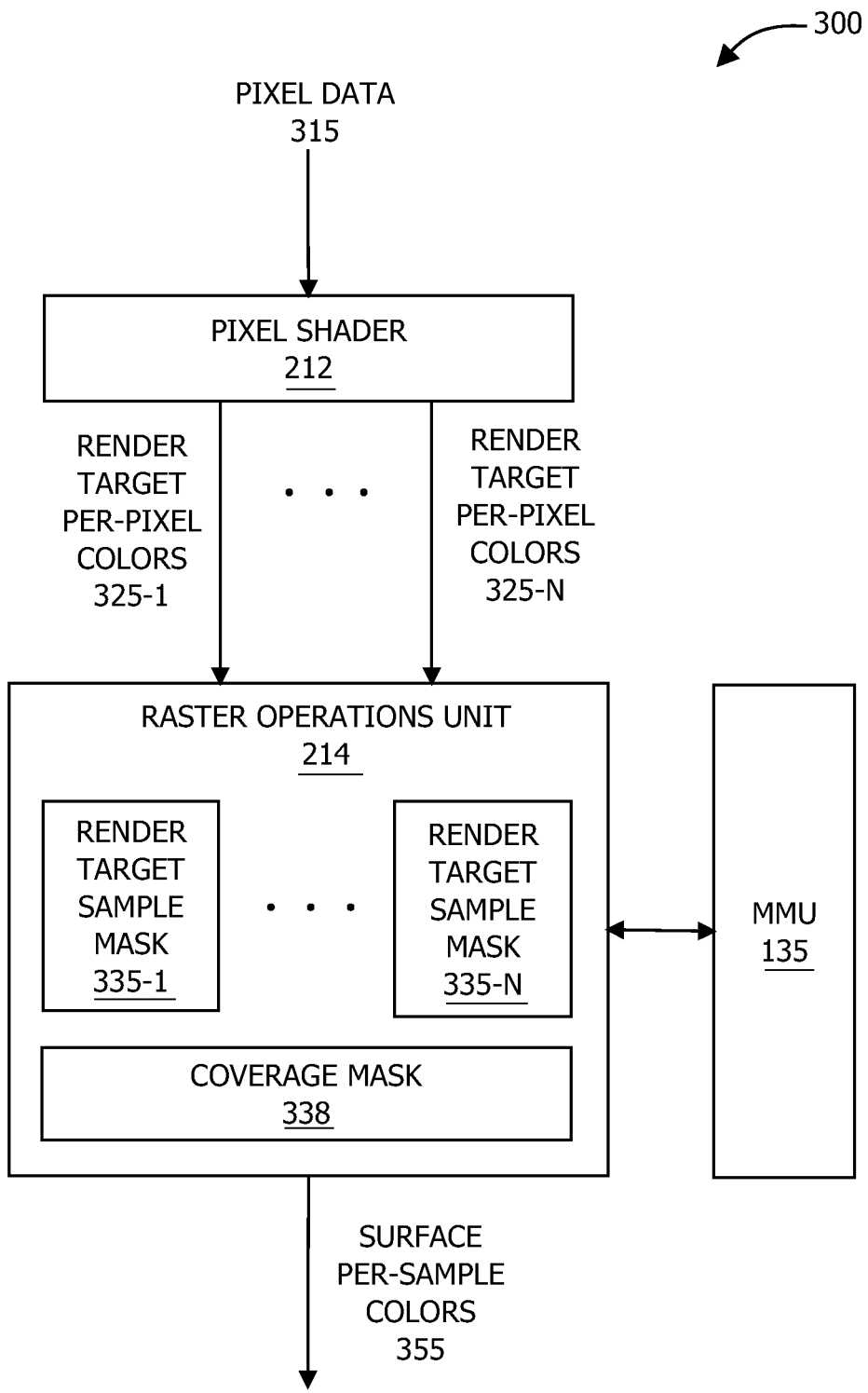
FIG. 3 is a is a conceptual diagram illustrating how pixel data is processed within the parallel processing subsystem of FIG. 2, according to one embodiment of the present invention.

FIG. 3 is a is a conceptual diagram illustrating how pixel data 315 is processed within the parallel processing subsystem 112 of FIG. 2, according to one embodiment of the present invention. In particular, the graphics processing pipeline of FIG. 2 is configured to render to a number N of multiple render targets, where N is equal to the number of samples included in each pixel. In addition, the parallel processing subsystem 112 is configured to map the addresses in a virtual address space corresponding to each of the multiple render targets to the same addresses in a physical address space.

Within the graphics processing pipeline 200, the pixel shader 212 processes each pixel individually and is configured to process pixel data 315 as specified by a pixel shading program. Notably, the pixel shader 212 is configured to output a separate render target per-pixel colors 325 to each of the multiple render targets. In general, the pixel shader 212 outputs a separate color value to a number N of render target per-pixel colors 325, where N≥1. (Herein, multiple instances of like objects are denoted with reference numbers identifying the object and hyphenated numbers identifying the instance where needed.) Because the number N of render target per-pixel colors 325 equals the number N of multiple render targets, the number of render target per-pixel colors 325 equals the number of samples included in each pixel. In alternate embodiments, the number of render targets and, consequently, the number of render target per-pixel colors may not equal the number of samples. In some embodiments, the number of render targets divided by the number of samples is an integer, so that each render target represents an equal fraction of each pixel. In an alternate embodiment, the Graphics API 142 provides the software application 125 a means to specify the ratio of samples per render target.

The pixel shader 212 computes a single color value for each render target per-pixel colors 325. However, each render target per-pixel colors 325 stores color values for each sample included in the pixel corresponding to pixel data 315. Consequently, the pixel shader 212 is configured to broadcast the single color value to each of the covered samples included in the render target per-pixel colors 325. For instance, suppose that the pixel shader 212 or rasterizer 210 were to determine that the pixel corresponding to pixel data 315 was fully covered at this point in the rendering process. The pixel shader 212 would broadcast the computed color value to all of the samples included in the render target per-pixel colors 325-1. In contrast, suppose that the pixel shader 212 or rasterizer 210 were to determine that one or more samples included in the pixel were not covered at this point in the rendering process. The pixel shader 212 would broadcast the color value to only the covered samples included in the render target per-pixel colors 325-1. The pixel shader 212 or rasterizer 210 may be configured to determine the sample coverage in any technically feasible fashion. For instance, the pixel shader 212 may determine the sample coverage by examining the raster coverage, performing a depth test, and so on.

Advantageously, the pixel shader 212 is configured to perform shading operations separately for each sample included in the pixel corresponding to the pixel data 315. Further, the pixel shader 212 is configured to output each of the resulting per-sample color values to a different render target as render target per-pixel colors 325. More specifically, the pixel shader 212 outputs the color value associated with a first sample included in the pixel to render target per-pixel colors 325-1. The pixel shader 212 outputs the color value associated with a second sample included in the pixel to render target per-pixel colors 325-2, and so on. Also advantageously, computations in the pixel shader can be shared across samples, because one pixel shader generates multiple sample color values, but some computations are needed for all the sample color values.

The ROP unit 214 receives the render target per-pixel colors 325, determines render target (RT) filtered, per-pixel colors, and writes surface per-pixel colors 355. In general, the ROP unit 214 may be configured to perform a variety of filtering operations involving bit masks. In particular, the ROP unit 214 uses render target sample masks 335 to filter the render target per-pixel colors 325. The ROP unit 214 applies a different render target sample mask 335 to each render target. The ROP unit 214 is configured to further filter the samples based on a coverage mask 338 that does not differ between the multiple render targets. The coverage mask 338 may be computed in any technically feasible fashion and typically includes raster pixel coverage, Z test results, alpha test results, stencil test results, and post-pixel shader coverage mask data.

For each render target, the ROP unit 214 creates a render target-specific composite mask by performing a bit-wise AND of the coverage mask 338 with the render target sample mask 335 associated with the render target. Subsequently, the ROP unit 214 uses the composite mask to determine which of the samples included in the render target to update based on data included in the associated render target per-pixel colors 325. For instance, suppose that the render target-specific composite mask were to include a logical 1 at the location corresponding to a particular sample. The ROP unit 214 would update the location included in a render target filtered, per-pixel colors corresponding to the sample using the color value included in the associated render-target per-pixel colors 325. Further suppose that the render target-specific composite mask were to include a logical 0 at the location corresponding to a particular sample. The ROP unit 214 would not update the location included in the render target filtered, per-pixel colors corresponding to the sample. In alternate embodiments, the ROP unit may perform any type and number of logical operations with the render target sample masks to create render target-specific composite masks.

The ROP unit 214 stores the render target filtered per-pixel colors as processed graphics data 220 of FIG. 2 in a buffer included in memory accessible to the ROP unit 214. For instance, the ROP unit 214 may store the processed graphics data 220 in a frame buffer (not shown) included in the parallel processing memory 124. The MMU 135 of FIG. 1 is configured to map the virtual address ranges corresponding to each of the multiple render targets to the same address range in a physical address space, thereby creating a surface that includes surface per-sample colors 355. More specifically, in operation, the MMU 135 maps the render target filtered, per-pixel colors to the same addresses in physical memory, such as the same addresses in the frame buffer. Notably, the render target sample masks 335 ensure that multiple colors are not aliased to the same sample location in physical memory. Through address manipulation, the MMU 135 effectively creates a single, composite surface that includes the surface per-sample colors 355 by causing the render targets to alias to one surface. Advantageously, because all of the render target filtered, per-pixel colors are mapped to the surface per-sample colors 355, the graphics processing pipeline 200 performs per-sample color shading while executing the pixel shader 212 only once per pixel.

It will be appreciated that the parallel processing subsystem 112 shown herein is illustrative and that variations and modifications are possible. In particular, the graphics processing pipeline 200 may be configured to perform fragment shading operations at various sampling rates using any combination of multiple render target sample masks 335. More specifically, in alternate embodiments, the pixel shader may be configured to compute and output color values at any level of granularity. For example, suppose that the pixel were to include four samples and the pixel shader were configured to output to two render targets. Further, suppose that the pixel shader were configured to compute a single color associated with samples 1 and 2, and a different color value associated with samples 3 and 4. In such a scenario, the pixel shader would output a single color value to the render target per-pixel colors corresponding to samples 1 and 2, and a different color value to the render target per-pixels colors corresponding to samples 3 and 4. Again, the pixel shader would update each of the covered samples included in each render target per-pixel colors with a render-target specific color.

In some embodiments, the sampling rate may be configured to vary across the surface based on the type of lighting computation or level of detail. For instance, suppose that the software application were to configure the multiple render target sample masks and a pixel shading program to compute per-sample specular lighting color values, per-pixel diffuse lighting color values, and per-pixel ambient lighting color values. Further, suppose that the software application were to configure the graphics processing pipeline to combine the specular lighting color values, the diffuse lighting color values, and the ambient lighting color values to produce overall per-sample color values. The number and complexity of the pixel shading computations performed by the pixel shader would be reduced while retaining important sample-specific color information.

In other embodiments, the software application could use multiple render target sample masks to perform traditional multisample rendering with each sample stored in a separate surface. In such an embodiment, the software application would specify a separate render target and associated render target sample mask for each sample. The software application would also specify that each render target maps to a separate physical memory. Further, for the case of the coverage mask 338 having more samples than the surface per-sample colors 355 has per sample, for each render target, the ROP unit would apply an additional logical OR reduction on the corresponding bits of the associated target-specific composite mask to compute a sample coverage bit. If the sample coverage bit were to equal a logical 1, then the ROP unit would update the associated render target. If the sample coverage bit were to equal a logical 0, then the ROP unit would not update the associated render target. Thus each render target would include only the color values associated with a single sample location. Advantageously, for operations such as screen space ambient occlusion, the resulting memory locality of sample data would enable more efficient memory access.

Figure 4:
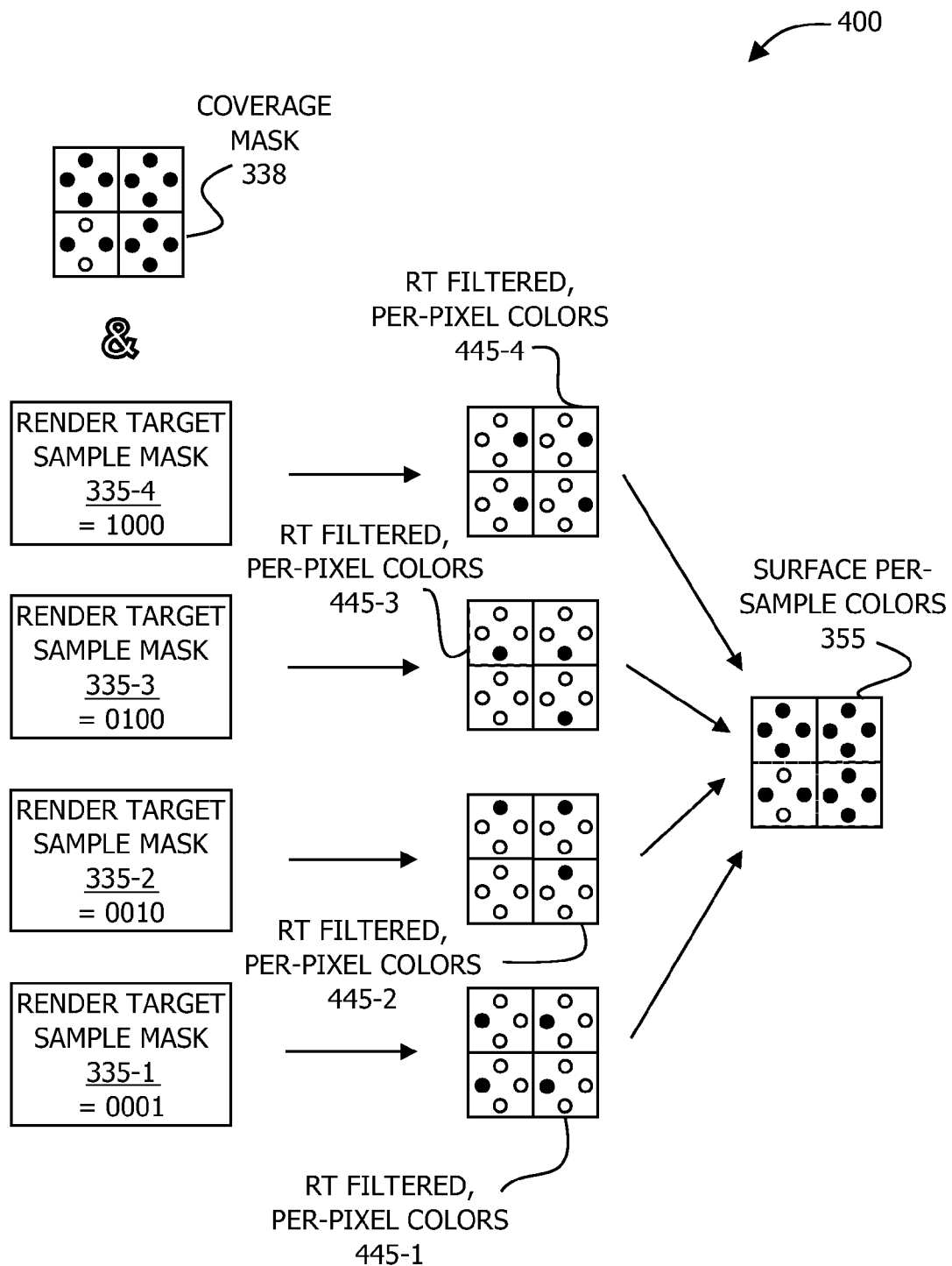
FIG. 4 is a conceptual diagram illustrating the coverage mask, the render target sample masks, and the surface per-sample colors of FIG. 3 and render target filtered per-pixel colors, according to one embodiment of the present invention.

FIG. 4 is a conceptual diagram illustrating the coverage mask 338, the render target sample masks 335-1 through 335-4, the surface per-sample colors 355 of FIG. 3 and render target filtered, per-pixel colors 445-1 through 445-4, according to one embodiment of the present invention. Note that the exemplary pixel shader 212 corresponding to FIG. 4 is configured to process each pixel individually, and four pixel shaders 212 execute in parallel, and optionally cooperation with each other, so as to generate a 2×2 set of four pixels. Further, each pixel is subdivided into a two-by-two set of samples. The coverage mask 338, the render target sample masks 335, the render target (RT) filtered, per-pixel colors 445, and the surface per-sample colors 355 all represent two-by-two set of pixels (i.e., sixteen samples).

As shown, the coverage mask 338 specifies that all of the samples included in three of the four pixels are covered. The coverage mask 338 also specifies that only the left and right samples included in the bottom-left pixel are covered. As also shown, each of the render target sample masks 335-1 through 335-4 selects a single sample included in the pixel. The render target sample mask 335-1, 0b0001, selects the left sample included in each pixel. The render target sample mask 335-2, 0b0010, selects the top sample included in each pixel. The render target sample mask 335-3, 0b0100, selects the bottom sample included in each pixel. The render target sample mask 335-4, 0b1000, selects the right sample included in each pixel.

The ROP unit 214 of FIG. 2 creates a render target-specific composite mask by performing a logical bit-wise AND of the coverage mask 338 with the render target sample mask 335-1. The ROP unit 214 then uses the render target-specific coverage mask to determine which of the render target per-pixel colors 325-1 of FIG. 1 to use to update render target filtered, per-pixel colors 445-1. Consequently, the ROP unit 214 updates the left sample of each of the pixels included in the render target filtered, per-pixel colors 445-1. The ROP unit 214 does not update the top, bottom, and right samples of any of the pixels included in the render target filtered, per-pixel colors 445-1.

Similarly, the ROP unit 214 updates the top sample of three of the four pixels included in the render target filtered, per-pixel colors 445-2 using the corresponding color values included in render target per-pixel colors 325-1. The ROP unit 214 does not update the left, bottom, and right samples of any of the pixels included in the render target filtered, per-pixel colors 445-2. Nor does the ROP unit 214 update any of the samples in the bottom-left pixel included in the render target filtered, per-pixel colors 445-2.

The ROP unit 214 updates the bottom sample of three of the four pixels included in the render target filtered, per-pixel colors 445-3 using the corresponding color values included in render target per-pixel colors 325-3. The ROP unit 214 does not update the left, top, and right samples of any of the pixels included in the render target filtered, per-pixel colors 445-3. Nor does the ROP unit 214 update any of the samples included in the bottom-left pixel included in the render target filtered, per-pixel colors 445-3.

The ROP unit 214 updates the right sample of each of the four pixels included in the render target filtered, per-pixel colors 445-4 using the corresponding color values included in render target per-pixel colors 325-4. The ROP unit 214 does not update the left, top, and bottom samples of any of the pixels included in the render target filtered, per-pixel colors 445-4.

Advantageously, the MMU 135 of FIG. 1 is configured to map the virtual address ranges corresponding to each of the render target filtered, per-pixel colors 445-1 through 445-4 to the same address range in a physical address space. Thus, together the render target filtered, per-pixel colors 445-1 through 445-4 form the surface per-sample colors 355. Each of the render target filtered, per-pixel colors 445-1 through 445-4 may include a different color value for each pixel. Consequently, the surface per-sample colors 355 may include a different color for each sample included in each pixel. Notably, for a 2-by-2 array of pixels, the surface per-sample colors 355 could include sixteen different colors (one per sample, per pixel.) For instance, the four samples in the top-right pixel represented by the surface per-sample colors 355 could be green, red, yellow, and purple. As shown, the render target sample masks 335-1 through 335-4 ensure that multiple colors are not aliased to the same sample location in physical memory. Again, the pixel shader 212 does not process each sample individually, but the effective resolution of the resulting surface per-sample colors 355 corresponds to the granularity of a sample.

Figure 5:
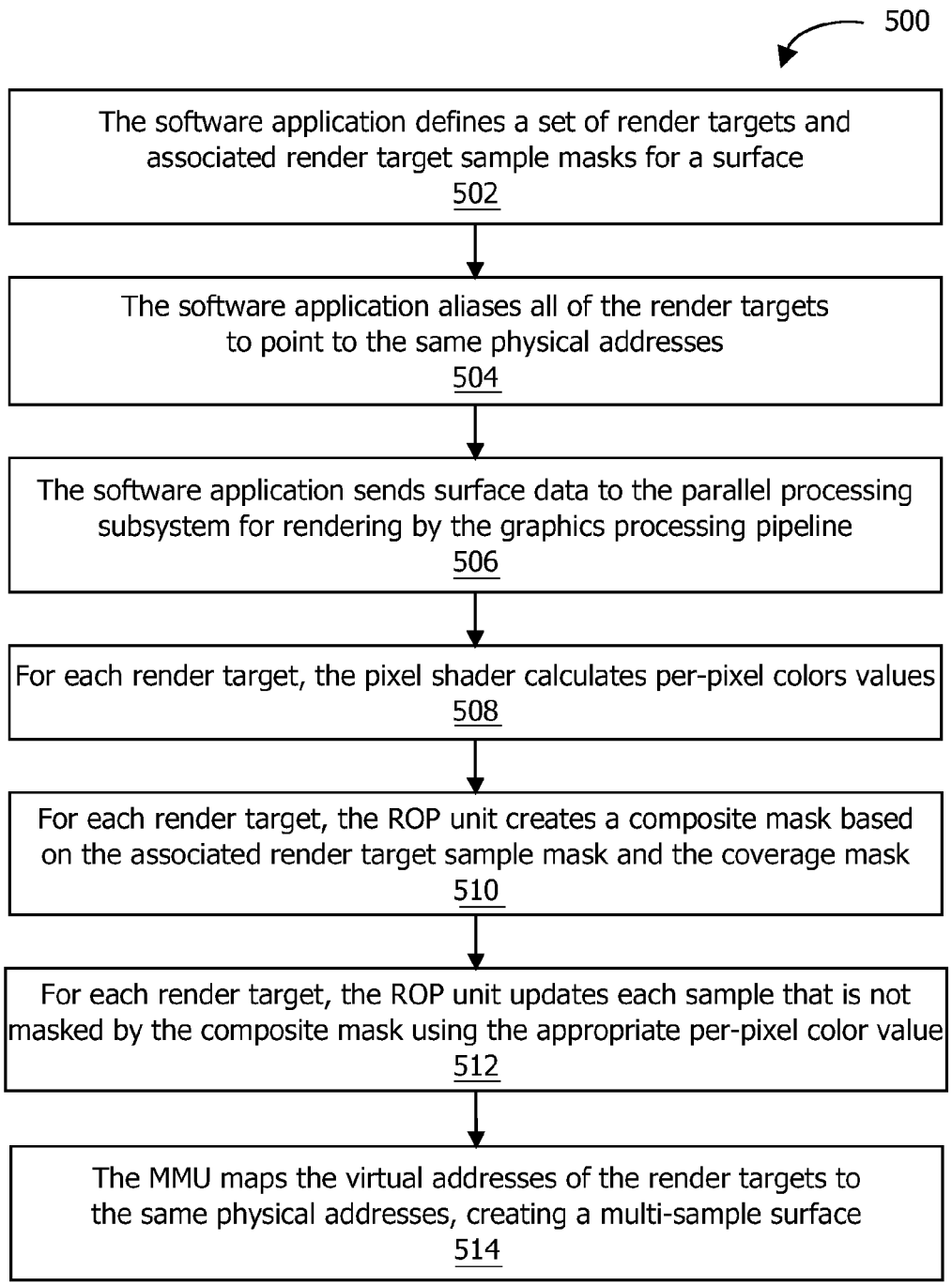
FIG. 5 is a flow diagram of method steps for processing pixels included in a surface, according to one embodiment of the present invention.

FIG. 5 is a flow diagram of method steps for processing pixels included in a surface, according to one embodiment of the present invention. Although the method steps are described in conjunction with the systems of FIGS. 1-4, persons skilled in the art will understand that any system configured to implement the method steps, in any order, falls within the scope of the present invention.

As shown, a method 500 begins at step 502, where the software application 125 defines a set of render targets and associated render target sample masks 335 for a surface. At step 504, the software application 125 aliases all of the render targets associated with the surface to point to the same physical addresses. At step 506, the software application 125 send surface data to the parallel processing subsystem 112 for rendering by the graphics processing pipeline 200. At step 508, for each render target, the pixel shader 212 computes per-pixel color values. More specifically, the pixel shader 212 processes each pixel individually, but outputs different color values to each render target as render target per-pixel colors 325. Advantageously, the pixel shading program executed by the pixel shader 212 may be configured to compute color values per-sample and, subsequently, output the color value of each sample to a separate render target. Consequently, the graphics processing pipeline 200 may be configured to preserve sample-level color granularity without incurring the loss of efficiency associated with processing each sample individually.

At step 510, for each render target, the ROP unit 214 creates a composite mask based on the render target sample mask 335 associated with the render target and the coverage mask 338. As outlined previously herein, the render target sample masks 335 enable the software application 125 to specify which samples included in the render target are eligible for updating. For instance, to achieve per-sample granularity, the software application 125 could use the render target sample masks 335 to specify a single, eligible sample for each render target. Further, the software application 125 could structure each render target sample mask 335 to select a different eligible sample within the associated render target. At step 512, for each render target, the ROP unit 214 uses the color values included in the associated render target per-pixel colors 325 to update each sample in the associated render target filtered, per-pixel colors 445 that is not masked by the composite mask. At step 514, the MMU 135 maps the virtual addresses of the render targets, representing the render target filtered, per-pixel colors 445, to the same physical addresses. Because each of the render targets may represent a separate sample, by mapping the render targets in this fashion, through address manipulation, the MMU 135 effectively creates a single, composite surface that includes the surface per-sample colors 355 by causing the render targets to alias to one surface. Advantageously, the render target sample masks 335 ensure that multiple colors within the one surface are not aliased to the same sample location in physical memory.

In sum, 2-D images may be more efficiently and realistically rendered by using multiple render target sample masks. In one implementation, a runtime API is configured to expose additional pixel shading functionality within the graphics processing pipeline. In operation, the additional functionality enables a software application to create multiple render target sample masks to flexibly direct the granularity of shading calculations. For example, the software application configures the pixel shader to process each pixel individually, but to output sample-specific color values. More specifically, for each surface, the software application defines a set of render targets and associated render target sample masks. Both the number of render targets and the number of render target sample masks equal the number of samples included in a pixel. Further, each sample mask is configured to cover a different sample and filter all of the other samples. In addition, the software application aliases all of the render targets to point to the same physical addresses. The software application then sends the surface data to the parallel processing system for rendering by the graphics processing pipeline.

Within the graphics processing pipeline, upon receiving a pixel, the pixel shader calculates a single, unique per-target color value for each of the render targets. For example, if there were four render targets, then the pixel shader would calculate four different color values—a different color value for each of the render targets. Subsequently, for each render target, a ROP unit performs a logical AND operation of the coverage mask with the render target sample mask, creating a per-target composite mask. The ROP unit then updates the samples included in each render target based on the associated per-target color value and the per-target composite mask. Consequently, for each render target, the ROP unit has to update a maximum of one sample per pixel. Finally, the MMU maps the virtual addresses of the render targets to the same physical addresses, thus creating a multi-sample surface.

Advantageously, by configuring the pixel shader to output sample-specific color values, the disclosed techniques enable software applications to increase the realism of rendered 2-D images compared to prior art approaches such as multisampling. Again, the pixel shader does not process each sample individually. Consequently, software applications that exceed acceptable execution times using prior-art techniques (e.g., supersampling) may produce acceptable results without exceeding acceptable execution times using multiple target render masks. In particular, software applications may use various combinations of render targets and associated render target masks to vary the shading rate, thereby tuning the rendering quality and execution speed. For instance, software applications may vary the shading rate based on lighting component (e.g., specular, diffuse, etc.), level of detail, surface location, and so on.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method for updating samples included in render targets, the method comprising:
   receiving a first render target included in a plurality of render targets related to a first surface;
   receiving a second render target included in the plurality of render targets related to the first surface;
   mapping the first render target and the second render target to the same physical address space;
   receiving first pixel data related to a first pixel included in the first surface;
   computing a first color value based on the first pixel data;
   creating a first composite mask based on a first coverage mask and a first render target sample mask, wherein the first coverage mask is associated with the first surface, and the first render target sample mask is associated with the first render target; and
   updating a first sample included in the first render target and associated with the first pixel based on the first color value and the first composite mask;
   wherein a second sample included in the second render target stores second pixel data related to a second pixel included in the first surface.

2. The method of claim 1, wherein creating the first composite mask comprises performing a bit-wise logical AND operation of the first coverage mask with the first render target sample mask.

3. The method of claim 2, wherein the second sample is associated with the first pixel, and further comprising:
   computing a second color value based on the first pixel data;

creating a second composite mask based on the first coverage mask and a second render target sample mask, wherein the second render target sample mask is associated with the second render target; and updating the second sample based on the second color value and the second composite mask.

4. The method of claim 3, wherein the value of the first render target sample mask does not equal the value of the second render target sample mask.

5. The method of claim 4, wherein the first render target and the second render target map to identical addresses in a virtual memory space.

6. The method of claim 4, wherein the first render target and the second render target map to different addresses in a virtual memory space, and the method further comprises:

mapping a first virtual address corresponding to the first render target to a first physical address in a physical memory space; and mapping a second virtual address corresponding to the second render target to the first physical address.

7. The method of claim 1, further comprising:

receiving a second render target included in a plurality of render targets related to the first surface;

computing a second color value based on the first pixel data;

updating a second sample included in the second render target and associated with the first pixel based on the second color value and the first coverage mask.

8. The method of claim 1, further comprising:

performing a reduction OR operation on the bits included in the first composite mask to generate a sample coverage bit; and updating all of the samples included in the first render target and associated with the first pixel based on the sample coverage bit and the first color value.

9. The method of claim 1, further comprising generating the first render target sample mask based on a first render target index that is associated with a currently drained shaded quad.

10. The method of claim 1, wherein the first render target and the second render target map to identical addresses in a virtual memory space.

11. The method of claim 1, wherein the first render target and the second render target map to different addresses in a virtual memory space, and the method further comprises:

mapping a first virtual address corresponding to the first render target to a first physical address in a physical memory space; and mapping a second virtual address corresponding to the second render target to the first physical address.

12. A non-transitory computer-readable storage medium including instructions that, when executed by a processing unit, cause the processing unit to update samples included in render targets by performing the steps of:

receiving a first render target included in a plurality of render related to a first surface;

receiving a second render target included in the plurality of render targets related to the first surface;

mapping the first render target and the second render target to the same physical address space;

receiving first pixel data related to a first pixel included in the first surface;

computing a first color value based on the first pixel data;

creating a first composite mask based on a first coverage mask and a first render target sample mask, wherein the first coverage mask is associated with the first surface, and the first render target sample mask is associated with the first render target; and updating a first sample included in the first render target and associated with the first pixel based on the first color value and the first composite mask;

wherein a second sample included in the second render target stores second pixel data related to a second pixel included in the first surface.

13. The computer-readable storage medium of claim 12, wherein creating the first composite mask comprises performing a bit-wise logical AND operation of the first coverage mask with the first render target sample mask.

14. The computer-readable storage medium of claim 13, wherein the second sample is associated with the first pixel, and further comprising:

computing a second color value based on the first pixel data;

creating a second composite mask based on the first coverage mask and a second render target sample mask, wherein the second render target sample mask is associated with the second render target; and updating the second sample based on the second color value and the second composite mask.

15. The computer-readable storage medium of claim 14, wherein the value of the first render target sample mask does not equal the value of the second render target sample mask.

16. The computer-readable storage medium of claim 15, wherein the first render target and the second render target map to a first plurality of addresses in a virtual memory space.

17. The computer-readable storage medium of claim 15, wherein the first render target and the second render target map to different addresses in a virtual memory space, and the method further comprises:

mapping a first virtual address corresponding to the first render target to a first physical address in a physical memory space; and mapping a second virtual address corresponding to the second render target to the first physical address.

18. The computer-readable storage medium of claim 12, further comprising:

updating a second sample included in the second render target and associated with the first pixel based on the second color value and the first coverage mask.

19. The computer-readable storage medium of claim 12, further comprising:

performing a reduction OR operation on the bits included in the first composite mask to generate a sample coverage bit; and updating all of the samples included in the first render target and associated with the first pixel based on the sample coverage bit and the first color value.

20. The computer-readable storage medium of claim 12, further comprising generating the first render target sample mask based on a first render target index that is associated with a currently drained shaded quad.

21. A system configured to update samples included in render targets, the system comprising:

a graphics processing unit configured to:

receive a first render target included in a plurality of render targets related to a first surface;

receive a second render target included in the plurality of render targets related to the first surface;

map the first render target and the second render target to the same physical address space;

receive first pixel data related to a first pixel included in the first surface;

compute a first color value based on the first pixel data;

create a first composite mask based on a first coverage mask and a first render target sample mask, wherein the first coverage mask is associated with the first surface, and the first render target sample mask is associated with the first render target; and update a first sample included in the first render target and associated with the first pixel based on the first color value and the first composite mask;

wherein a second sample included in the second render target stores second pixel data related to a second pixel included in the first surface.

22. The system of claim 21, wherein creating the first composite mask comprises performing a bit-wise logical AND operation of the first coverage mask with the first render target sample mask.

23. A non-transitory computer-readable storage medium including instructions that, when executed by a processing unit, cause the processing unit to perform the steps of:

set, via a 3D graphics application program interface, different render target sample masks each render target included in a plurality of render targets;

receive a first render target included in the plurality of render targets related to a first surface;

receive a second render target included in the plurality of render targets related to the first surface;

map the first render target and the second render target to the same physical address space;

receive first pixel data related to a first pixel included in the first surface;

compute a first color value based on the first pixel data;

create a first composite mask based on a first coverage mask and a first render target sample mask, wherein the first coverage mask is associated with the first surface, and the first render target sample mask is associated with the first render target; and update a first sample included in the first render target and associated with the first pixel based on the first color value and the first composite mask;

wherein a second sample included in the second render target stores second pixel data related to a second pixel included in the first surface.

24. The computer-readable storage medium of claim 23, wherein setting the different render target sample masks is performed via a pipeline state setting.

25. The computer-readable storage medium of claim 23, wherein setting the different render target sample masks is performed via a pixel shader.

26. The computer-readable storage medium of claim 23, wherein setting the different render target sample masks is performed by specifying a ratio between render targets and pixel samples.

* * * * *